United States Patent
Rivera-Cintron et al.

(10) Patent No.: US 7,049,941 B2
(45) Date of Patent: May 23, 2006

(54) METHOD AND SYSTEM FOR ALERTING A USER OF A MOBILE COMMUNICATION DEVICE

(75) Inventors: Carlos A. Rivera-Cintron, Lake Worth, FL (US); Daniel A. Baudino, Lake Worth, FL (US)

(73) Assignee: Motorola, Inc., Schaumburg, IL (US)

( * ) Notice: Subject to any disclaimer, the term of this patent is extended or adjusted under 35 U.S.C. 154(b) by 111 days.

(21) Appl. No.: 10/882,587

(22) Filed: Jul. 1, 2004

(65) Prior Publication Data

US 2006/0003752 A1    Jan. 5, 2006

(51) Int. Cl.
*B60Q 1/00* (2006.01)

(52) U.S. Cl. .............................. 340/425.5; 340/426.14; 340/438; 340/457; 340/459; 340/460; 340/461; 701/1; 701/36

(58) Field of Classification Search ............. 340/425.5, 340/426.13, 426.14, 426.16, 426.25, 438, 340/439, 457, 459, 460, 461; 701/36, 70, 701/1
See application file for complete search history.

(56) References Cited

U.S. PATENT DOCUMENTS

| | | | | |
|---|---|---|---|---|
| 5,357,438 A | * | 10/1994 | Davidian | 701/301 |
| 5,574,999 A | * | 11/1996 | Gropper | 455/186.1 |
| 5,648,755 A | * | 7/1997 | Yagihashi | 340/439 |
| 6,441,726 B1 | * | 8/2002 | Voto et al. | 340/438 |
| 6,459,961 B1 | * | 10/2002 | Obradovich et al. | 701/1 |
| 6,707,383 B1 | * | 3/2004 | Flaherty | 340/573.1 |
| 6,895,316 B1 | * | 5/2005 | Chen et al. | 701/36 |

* cited by examiner

*Primary Examiner*—Daryl C Pope
(74) *Attorney, Agent, or Firm*—Larry G. Brown

(57) ABSTRACT

The invention concerns a method (200) and control system (100) for alerting a user of a mobile communication device (110). The method includes the steps of receiving (216) a communication request at the mobile communication device in a vehicle (114), detecting (224) whether a predetermined vehicle condition is present in response to the receipt of the communication request, assigning (226) a predetermined alert mode based on the presence of a predetermined vehicle condition and alerting (234) a user of the mobile communication device of the communication request in accordance with the assigned predetermined alert mode.

27 Claims, 4 Drawing Sheets

METHOD AND SYSTEM FOR ALERTING A USER OF A MOBILE COMMUNICATION DEVICE

BACKGROUND OF THE INVENTION

1. Field of the Invention

This invention relates in general to methods and systems for mobile communication devices in vehicles and more particularly, for alerting users of such devices.

2. Description of the Related Art

In recent years, portable electronic devices, such as cellular telephones and personal digital assistants, have become commonplace. Many individuals use such mobile units in a wide variety of situations. For example, many cellular telephone users conduct conversations while they are operating a vehicle, such as a car. Unfortunately, this process may distract the user's attention as he is driving and may contribute to accidents. In response, many municipalities and states have taken steps to outlaw the use of mobile units while a user is driving.

To overcome the hazards associated with driving while using a mobile unit, many mobile unit manufacturers have developed devices that permit a driver to engage in a conversation on a mobile unit without requiring the use of the driver's hands. These devices may be helpful because they are designed to reduce the driver's physical interaction with the mobile unit. Nevertheless, some interaction by the driver is still required to answer or place any calls, and no consideration is given in determining when it may not be safe for a driver to engage in a conversation.

SUMMARY OF THE INVENTION

The present invention concerns a method for alerting a user of a mobile communication device. The method includes the steps of receiving a communication request at the mobile communication device in a vehicle, detecting whether a predetermined vehicle condition is present in response to the receipt of the communication request, assigning a predetermined alert mode based on the presence of the predetermined vehicle condition and alerting the user of the mobile communication device of the communication request in accordance with the assigned predetermined alert mode. The method can also include the step of coupling the mobile communication device to a control system of the vehicle. The mobile communication device can be coupled to the control system of the vehicle through a wireless connection or a hard-wired connection. In one arrangement, the method can also include the steps of setting an alert option, checking the status of the alert option when the communication request is received and performing the alerting step only if the status of the alert option permits the alerting step.

As an example, the predetermined vehicle condition can be the vehicle being in a braking condition, the vehicle being on a wet road or the vehicle being in a predetermined speed range. As another example, the predetermined alert mode can be a high-risk alert mode, a moderate-risk alert mode or a low-risk alert mode. In one arrangement, the predetermined speed range can be a high speed range, a moderate speed range or a low speed range.

In one embodiment of the invention, the assigning the alert mode step an include assigning a high-risk alert mode if the predetermined vehicle condition is the vehicle being in a braking condition, the vehicle being on a wet road or the predetermined speed range being the high speed range. Alternatively, the assigning the alert mode step can include assigning a moderate-risk alert mode if the predetermined vehicle condition is the predetermined speed range being the moderate speed range. In yet another alternative embodiment, the assigning the alert mode step can include assigning a low-risk alert mode if the predetermined vehicle condition is the predetermined speed range being the low speed range.

The alerting the user of the mobile communication device step can include audibly alerting the user of the mobile communication device of the communication request through an audio system of the vehicle or visually alerting the user through an illuminating indicator of the vehicle. For example, when the user of the mobile communication device is audibly alerted of the communication request, the method can further include the step of setting an audio level based on whether the alert mode is a high-risk alert mode, a moderate-risk alert mode or a low-risk alert mode. In addition, when the user of the mobile communication device is visually alerted of the communication request, the method can further include the step of setting an illumination level based on whether the alert mode is a high-risk alert mode, a moderate-risk alert mode or a low-risk alert mode.

In another arrangement, the method can further include the steps of detecting a noise level when the communication request is received and reducing the noise level. The method can further include the steps of—after a predetermined time period—determining whether the user has responded to the alert of the communication request and raising the level of the alert if the user has not responded within the predetermined time period.

The present invention also concerns a control system in a vehicle for alerting a user of a mobile communication device. The control system includes a mobile unit interface, a processor coupled to the mobile unit interface and an alert section coupled to the processor. The mobile unit interface receives a communication request from a mobile communication device in the vehicle. Additionally, the processor is programmed to detect whether a predetermined vehicle condition is present in response to the receipt of the communication request and to assign a predetermined alert mode based on the presence of the predetermined vehicle condition. The alert section alerts the user of the mobile communication device of the communication request in accordance with the assigned predetermined alert mode. The control system can also include suitable software and/or circuitry to carry out the processes described above.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION

Figure 1:
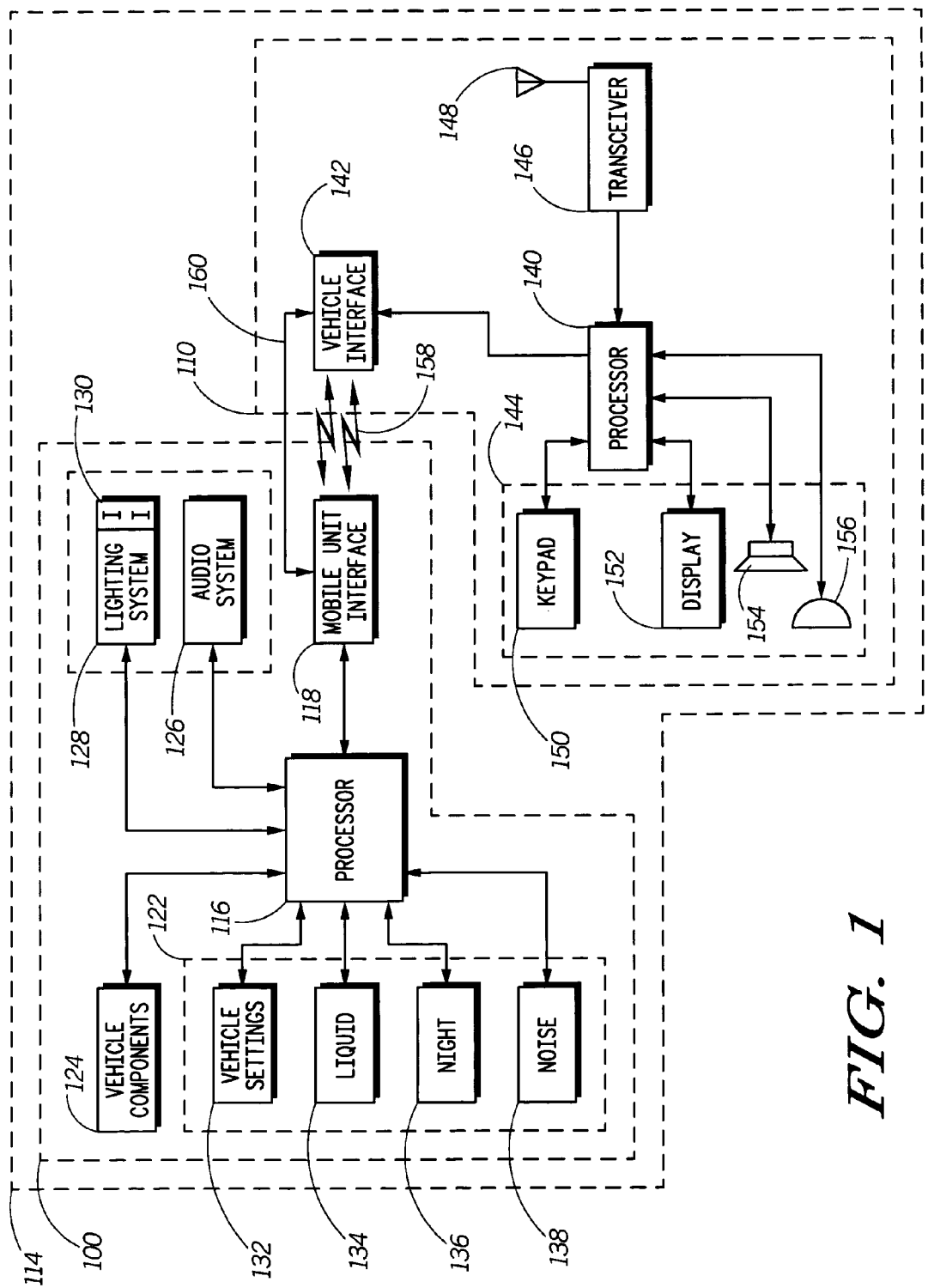
FIG. 1 illustrates a control system and a mobile communication device for alerting a user of the mobile communication device in accordance with an embodiment of the inventive arrangements.

While the specification concludes with claims defining the features of the invention that are regarded as novel, it is believed that the invention will be better understood from a consideration of the following description in conjunction with the drawing figures, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

This invention presents a method and system for alerting a user of a mobile communication device. Specifically, a mobile communication device, such as a cellular telephone, can be coupled to a control system in a vehicle. When the mobile communication device receives an incoming call, a driver of the vehicle (and user of the mobile communication device), can be alerted of the call through any number of vehicle components. Examples of vehicle components can include the vehicle's audio system and lighting system. In one arrangement, predetermined vehicle conditions—such as the speed of the vehicle, whether the vehicle is braking and whether the vehicle is traveling on a wet road—can be used to determine how the driver is alerted.

Referring to FIG. 1, a control system 100 and a mobile communication device 110 are illustrated. In one arrangement, the control system 100 can be part of a vehicle 114, although it is understood that the control system 100 can be implemented into other components. For purposes of the invention, the term vehicle can include any component that is capable of being used for transporting people and/or cargo, such as automobiles, motorcycles, airplanes and boats. As an example, the mobile communication device 110 can be situated in the vehicle 114, and a user of the mobile communication device 110 can be a driver (or even a passenger) of the vehicle 114. For purposes of the invention, the term driver and the term user can be synonymous.

In one arrangement, the control system 100 can include a processor 116, a mobile unit interface 118, an alert section 120, a sensor section 122 and a vehicle components block 124. As an example, the alert section 120 can include an audio system 126 and a lighting system 128 having at least one or more illuminating indicators 130. Additionally, the sensor section 122 can have a vehicle settings sensor 132, a liquid sensor 134, a night sensor 136 and a noise sensor 138. It is understood, however, that the invention is not so limited, as the alert section 120 and the sensor section 122 can have other suitable components.

The processor 116 can be coupled to the mobile unit interface 118, the alert section 120—including the audio system 126 and the lighting system 128— and the vehicle components block 124. The processor 116 can also be coupled to the sensor section 122, including the vehicle settings sensor 132, the liquid sensor 134, the night sensor 136 and the noise sensor 138.

In one embodiment, the mobile communication device 110 can include a processor 140, a vehicle interface 142, a user interface section 144 and a transceiver 146 having an antenna 148. As an example, the user interface section 144 can include a keypad 150, a display 152, a speaker 154 and a microphone 156. The processor 140 can be coupled to the vehicle interface 142, the transceiver 146 and the user interface section 144. As such, the processor 140 can also be coupled to the keypad 150, the display 152, the speaker 154 and the microphone 156.

In another embodiment, the mobile communication device 110 can be coupled to the control system 100. For example, as those of skill in the art will appreciate, the vehicle interface 142 and the mobile unit interface 118 can include any suitable components to enable the transfer of voice and/or data signals between the mobile communication device 110 and the control system 100 over a wireless communications link 158. Any suitable transmission protocol can be used to conduct this transfer, including Bluetooth or any Wireless Fidelity signal, sometimes commonly referred to as Wi-Fi. In another example, a hard-wired connection 160 can be used to facilitate the transfer of voice and/or data between the mobile communication device 110 and the control system 100. The mobile unit interface 118 and the vehicle interface 142 can transfer any such voice and data signals to their respective processors 116, 140.

Turning to the sensor section 122 of the control system 100, the vehicle settings sensor 132 can provide data about the vehicle 114 to the processor 116. For example, the vehicle settings sensor 132 can signal the processor 116 when the brakes of the vehicle 114 are applied and can provide a current speed of the vehicle 114. As another example, the vehicle settings sensor 132 can signal the processor 116 when any of the openings of the vehicle 114, such as windows or sunroofs, are lowered or opened. It must be noted that the invention is not so limited, as the vehicle settings sensor 132 can provide to the processor 116 data concerning any vehicle setting or parameter.

As is known in the art, many vehicles contain rain sensors for detecting rainfall. As such, the liquid sensor 134 of the sensor section 122 can signal the processor 116 when the liquid sensor 134 detects the presence of rainfall, or any other suitable liquid. This feature can permit the processor 116 to determine when the vehicle 114 is on a wet road. In addition, the night sensor 136 can be signal the processor 116 when it detects a night condition. Finally, the noise sensor 138 can signal the processor 116 when it detects noise above a predetermined threshold. Such noise can be generated by, for example, the audio system 126 of the vehicle 114 or by the windows of the vehicle 114 being opened. The vehicle components block 124 can include any components of the vehicle 114 that are capable of being operated. For example, the vehicle components block 124 can include the controls for operating the windows of the vehicle 114.

Referring to the alert section 120, the audio system 126 can include those components typically found in the stereo system of an automobile, for example. In one arrangement, the processor 116 can receive voice signals from the mobile communication device 110 (through the mobile unit interface 118) and can broadcast these signals over the audio system 126. In another arrangement, the processor 116 can detect when the mobile communication device 110 has received a communication request, such as an incoming call. The processor 116, in response, can alert the user of the mobile communication device 110 of the communication request through the audio system 126.

The lighting system 128 can include those components that are typically found in a vehicle's electrical system for purposes of illuminating interior or exterior portions of the car. For example, the lighting system 128 can include illuminating indicators 130, such as annunciators on the dashboard (not shown) or instrument panel (not shown) of the vehicle 114. As another example, the lights in a vehicle that provide general illumination, such as an overhead light, can be an illuminating indicator 130. In fact, any light that is part of a lighting system for a vehicle can be considered an illuminating indicator 130. Similar to the audio system 126, the processor 116 can cause the user of the mobile communication device 110 to be alerted of an incoming communication request through the lighting system 128. For example, one or more illuminating indicators 130 can be illuminated in any suitable fashion to inform the user of the communication request.

The mobile communication device 110 can be any unit capable of receiving and/or transmitting communications signals. Suitable examples include cellular telephones, personal digital assistants and two-way radios. As is known in the art, the mobile communication device 110 can receive and transmit communications signals via the transceiver 146 and the antenna 148. An incoming communication signal received by the antenna 148 and the transceiver 146 can be referred to as a communication request. As an example, an incoming call can be a communication request, although any other incoming (or even outgoing) communication signal can be considered a communication request.

The user may interact with the mobile communication device 110 through the user interface section 144. Specifically, the user may receive information from the display 152 or the speaker 154. The user may also enter information into or select choices from a menu through the keypad 150, the display 156 or the microphone 156. As such, the display 152 can be a touch screen display, and the mobile communication device 110 can include suitable software and circuitry for recognizing and processing speech commands.

In one arrangement, the antenna 148 and the transceiver 146 of the mobile communication device 110 can receive a communication request. In response, the processor 140 can check one or more alert settings to determine whether the user wishes to be alerted about the communication request. If enabled by the alert setting, the processor 140 can signal the vehicle interface 142, which can then signal the mobile unit interface 118 of the control system 100. The mobile unit interface 118 can signal the processor 116 of the control system 100. In one arrangement, the processor 116 can detect predetermined vehicle conditions by interfacing with the sensor section 122. Based on the predetermined vehicle conditions, the processor 116 can assign a predetermined alert mode. The processor 116 can then signal the alert section 120 to alert the user of the communication request in which the alert is performed in accordance with the assigned, predetermined alert level. This process will be explained further below.

Figure 2:
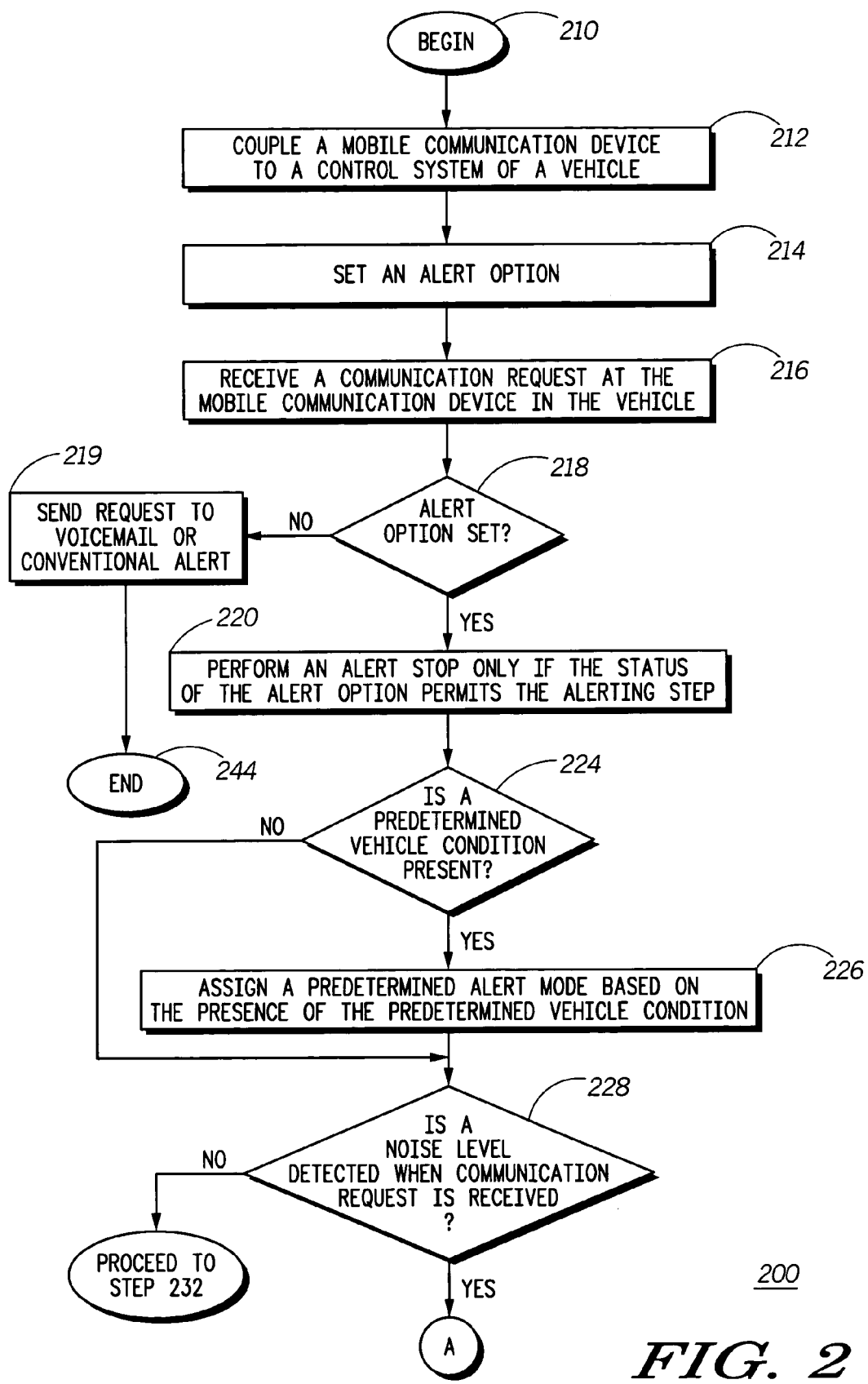
FIG. 2 illustrates a portion of a method for alerting a user of a mobile communication device in accordance with an embodiment of the inventive arrangements.

Referring to FIG. 2, a method 200 for alerting a user of a mobile communication device is shown. To describe this method 200, reference will be made to FIG. 1, although it is understood that the invention can be practiced in any other suitable system or component. In addition, the invention is not limited to these steps or the order in which they are presented, as any other suitable steps and order are within contemplation of the inventive arrangements.

At step 210, the method 200 can begin. At step 212, a mobile communication device can be coupled to a control system of a vehicle. In addition, at step 214, an alert option can be set. At step 216, a communication request can be received at the mobile communication device in the vehicle. At decision block 218, it can be determined whether an alert option has been set. If an alert option has not been set, the communication request can be sent to voicemail or a conventional alert can be performed, as shown at step 219. The method 200 can then end at step 244. In contrast, if an alert option has been set, the method 200 can resume at step 220. At step 220, an alert step can be performed only if the status of the alert option permits the alerting step.

For example, referring back to FIG. 1, the mobile communication device 110 can be coupled to the control system 100. As noted earlier, this engagement can be through a wireless communications link 158 or a hard-wired connection 160. The user (or driver) can set an alert option on the mobile communication device 110. Specifically, the user can select whether he wishes to be alerted of a communication request in accordance with the inventive arrangements while operating or riding in the vehicle 114. The selection can be made through the user interface section 144 such as the keypad 150, the display 152 or the microphone 156. As another option, the alert option can be set through any suitable user interface of the control system 100 or any other suitable system.

When a communication request is received, the processor 140 of the mobile communication device 110 can check the setting of the alert option. If it is set, the processor 140 can signal the vehicle interface 142, which in turn can signal the mobile unit interface 118. The mobile unit interface 118 can signal the processor 116 of the control system 100. The processor 116 can then take appropriate steps to cause the user to be alerted of the communication request. In other words, by setting the alert option, the user wishes to be informed of communication requests through the components of the control system 100, as will be explained below.

If the processor 140 determines that the alert option is not set, the processor 140 can cause the communication request to be routed to the voicemail system of the mobile communication device 110. Alternatively, the processor 140 can cause the user to be alerted by a conventional alert, such as the ringer of the mobile communication device 110. In any event, if the alert option is not selected, the control system 100 will not provide the alert for the communication request. In addition, it must be noted that the checking of the alert option and any of the subsequent actions described above can be performed by the components of the control system 100.

Referring back to the method 200 of FIG. 2, at decision block 224, it can be determined whether a predetermined vehicle condition is present. If a predetermined vehicle condition is present, a predetermined alert mode can be assigned, as shown at step 226. In one arrangement, the predetermined alert mode can be based on the type of predetermined vehicle condition. If no predetermined vehicle condition is present, the method 200 can resume at decision block 228.

As an example, the predetermined vehicle condition can be one of the following: (1) the vehicle being in a braking condition; (2) the vehicle being on a wet road; and (3) the vehicle being in a predetermined speed range. To detect the presence of a predetermined vehicle condition, referring back to FIG. 1, the processor 116, after being signaled of the communication request, can signal the sensor section 122. For example, the processor 116 can signal the vehicle settings sensor 132, and the vehicle settings sensor 132 can signal the processor 116 as to whether the vehicle 114 is currently braking and the present speed of the vehicle 114. If the vehicle 114 is braking, the processor 116 can determine that a predetermined vehicle condition exists. Moreover, if the speed of the vehicle 114 falls within a predetermined range, the processor 116 can also determine that a predetermined vehicle condition is present.

As another example, the processor 116 can signal the liquid sensor 134. If the liquid sensor 134 detects the presence of a liquid on a roadway on which the vehicle 114 is traveling, the liquid sensor 134 can signal the processor 116 of such an occurrence. As a result, the processor 116 can determine the presence of a predetermined vehicle condition when the vehicle 114 is on a wet road. Although the liquid sensor 134 may primarily detect the presence of water from rainfall or snow, the liquid sensor 134 can be designed to detect any other suitable liquid. Moreover, the invention is not limited to the three particular examples of predetermined vehicle conditions. A predetermined vehicle condition can be any setting, parameter or configuration of the vehicle 114 or any condition, such as an environmental situation, outside the vehicle 114 that affects or may affect the performance of the vehicle or driving conditions.

Based on the predetermined vehicle condition that it detects, the processor 116 can assign a predetermined alert mode based on the presence of the predetermined vehicle condition. In one arrangement, if the processor 116 determines that the predetermined vehicle condition is the vehicle 114 braking, the processor 116 can assign the alert as a high-risk alert mode. Additionally, if the processor 116 determines that the predetermined vehicle condition is the vehicle 114 being on a wet roadway or that the speed of the vehicle 114 is in a high speed range, the processor 116 can assign the alert as a high-risk alert mode. As an example, the high speed range can be any speed above fifty-five miles per hour, although any other suitable range can be employed.

In another arrangement, if the speed of the vehicle 114 falls within a moderate speed range, the processor 116 can assign the alert as a moderate-risk alert mode. As an example, the moderate speed range can be from twenty miles per hour to (but not including) fifty-five miles per hour. Again, other suitable ranges can be used. If the speed of the vehicle 114 is within a low speed range, the processor 116 can assign the alert as a low-risk alert mode. As an example, the low speed range can be from any speed at or above zero to (but not including) twenty miles per hour. Of course, any other suitable range can serve as the low speed range. As will be explained below, the user of the mobile communication device 110 can be alerted in a manner that is based on the type of alert mode that has been assigned.

Referring back to the method 200 of FIG. 2, at decision block 228, it can be determined whether a noise level is detected when the communication request is received. This noise level can be a predetermined noise level, and if it is met or exceeded, the method 200 can resume at step 230 of FIG. 3, through jump circle A. If the noise level does not meet or exceed the predetermined noise level, the method 200 can proceed to step 232 of FIG. 3. At step 230, the noise level can be reduced, at least until the noise level drops below the predetermined noise level.

For example, referring once again to FIG. 1, when the processor 116 receives the communication request, the processor 116 can signal the noise sensor 138. The noise sensor 138 can then determine the level of noise inside the vehicle 114 and can signal the processor 116 with this data. If the processor 116 determines that the level of noise is at or above a predetermined noise threshold, the processor 116 can signal the vehicle components block 124 in an effort to reduce the noise level. Specifically, the control system for the windows or any other opening in the vehicle 114 can be part of the vehicle components block 124. Because the vehicle settings sensor 132 can provide data about the window settings of the vehicle 114, the processor 116 can signal the vehicle components block 124 to cause the windows or other openings to be closed. This step can help lower the amount of noise in the vehicle 114, which can allow the user to hear more easily any subsequent alerts. Of course, the invention is not limited in this regard, as other suitable steps can be taken to reduce the amount of noise in the vehicle 114.

Figure 3:
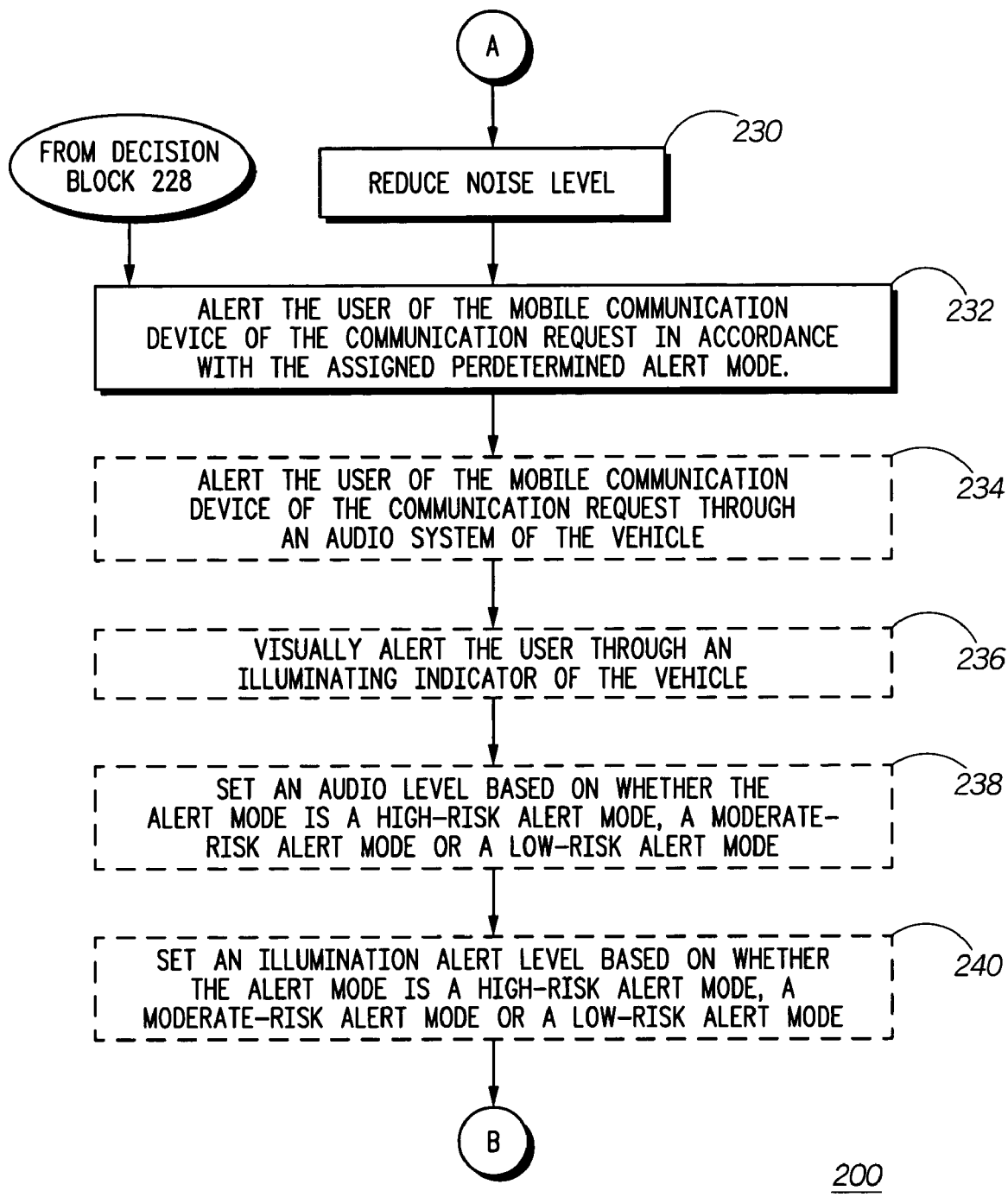
FIG. 3 illustrates another portion of the method of FIG. 2 in accordance with an embodiment of the inventive arrangements.

Turning back to the method 200 of FIG. 3, at step 232, the user of the mobile communication device can be alerted of the communication request in accordance with the assigned, predetermined alert mode. Additionally, at option step 234, the user of the mobile communication device can be alerted of the communication request through an audio system of the vehicle. In another arrangement, at option step 236, the user of the mobile communication device can be alerted of the communication request through an illuminating indicator of the vehicle. Moreover, if the user is alerted through the audio system, then at option step 238, an audio alert level can be set in which the audio alert level is based on whether the alert mode is a high-risk alert mode, a moderate-risk alert mode or a low-risk alert mode. Similarly, if the user is alerted through an illumination indicator, at option step 240, an illumination alert level can be set in which the illumination alert level is based on whether the alert mode is a high-risk alert mode, a moderate-risk alert mode or a low-risk alert mode. Setting the audio alert level can include any steps that can be taken to audibly alert the user. Further, setting the illumination alert level can include any steps that can be used to visually alert the user. The method 200 can then continue on to decision block 240 of FIG. 4 through jump circle B.

For example, referring back to FIG. 1, once the processor 116 has assigned the alert mode, the processor 116 can take steps to cause the user of the mobile communication device 110 to be alerted in accordance with the assigned alert mode. In one arrangement, the user can be alerted of the communication request through the audio system 126 and/or the lighting system 128, such as the illuminating indicator 130. Specifically, the processor 116 can signal the audio system 126 to broadcast an appropriate message or tone or series of tones. This message or tone(s) can indicate to the user that a communication request has been received at the mobile communication device 110.

The message or tone(s) can be any suitable audio for informing the user of the communication request, including a preprogrammed voice message or a portion of a song. This audio can be stored in any suitable memory, including an optical disc media (e.g., CD) loaded in the audio system 126. If a voice message is used, the user can be informed as to the telephone number from which the request is being initiated or the identity of the caller, for example. In one arrangement, if the audio system 126 is turned off when a communication request is received, the processor 116 can cause the audio system 126 to be activated to enable the alert to be broadcast.

The processor 116 can also signal the illuminating indicator 130 of the lighting system 128 to cause the illuminating indicator 130 to provide a visual indication of the communication request. As an example and as noted earlier, the illuminating indicator 130 can be an annunciator on the dashboard or instrument panel of the vehicle 114 that can be illuminated to provide the visual indication. As another example, the illuminating indicator 130 can be a visual projection, where a visual alert of the communication request can be projected onto the interior of the windshield or some other suitable surface. In fact, any light that is part of the lighting system 128 of the vehicle 114 can be an illuminating indicator 130. In one arrangement, information concerning the telephone number or the identity of the caller, for example, can be displayed to the user.

It is important to note that any other suitable component or system can be used to alert the user of the communication request. Also, it is not necessary to inform the user of the request through both the audio system 126 and the illuminating indicator 130, as only one of them can be used to alert the user.

In one arrangement, the manner in which the audio system 126 and the illuminating indicator 130 of the lighting system 128 alerts the user of the communication request can be in accordance with the type of alert mode. For example, if the processor 116 has assigned the alert mode as a high-risk alert mode, the process of alerting can be performed such that the user is minimally distracted. As a more specific example, the processor 116 can instruct the audio system 126 to generate a voice message having a low volume to inform the user of the communication request. Alternatively, the processor 116 can instruct the audio system 126 to generate a single beep. Details concerning the incoming communication request can also be kept to a minimum, such as merely announcing that a request is being received.

As another example, the processor 116 can select an illuminating indicator 130 that will minimize the user's distraction, such as a single annunciator on the instrument panel being illuminated. This display can merely proclaim that a request is being received with no additional detail to distract the user. Those of skill in the art will appreciate that there are many other ways to alert the user of the communication request in which the alert mode is designed to prevent the user from losing too much focus during high-risk, predetermined vehicle conditions. In fact, if the alert mode is a high-risk alert mode, the processor 116 can be programmed to prevent the user from being disturbed at all.

If the alert mode is a moderate-risk alert mode, the manner in which the user is alerted can become more intense. For example, the processor 116 can signal the audio system 126 to increase the volume or the level of detail of the broadcast used to alert the user of the communication request. The processor 116 can also signal the illuminating indicator 130 to, for example, illuminate more brightly or to flash intermittently. Additional illuminating indicators 130 can also be signaled to alert the user of the request. A greater number of illuminating indicators 130 can be used to signal the user of the request, including those indicators 130 that are outside the instrument panel, such as one that provides a visual projection. The level of detail in the visual alert can increase, as well.

If the alert mode is a low-risk alert mode, the processor 116 can signal the audio system 126 to, for example, increase the volume of the broadcast even further or to provide more detail about the incoming communication request. Similarly, the processor 116 can signal additional illuminating indicators 130 or can cause the illumination level to increase even more. A larger amount of information about the request can also be displayed. As another example, the vehicle 114 may be equipped with a display in the center console. In accordance with the low-risk alert mode, an indication that the request has been received and any information relevant to the request (e.g., the identity of the caller, the incoming telephone number, the location of the caller) can be displayed on this display.

Those of skill in the art will appreciate that the invention is not limited to these particular examples. Specifically, there are numerous ways in which a user can be alerted in accordance with the type of alert mode that is assigned. In short, based on this feature of the invention, the user can be alerted in any manner such that the intensity of level of the alert increases as the alert mode moves from a high-risk alert mode to a low-risk alert mode. Even so, it is understood that the user can be alerted in a universal fashion for each of the alert modes, i.e., the manner in which the user is alerted can be the same for each of the modes. If desired, the step of assigning the different types of alert modes can be skipped. Moreover, a user can be alerted in a universal fashion if no predetermined vehicle condition is present or is intended to be ignored or overridden.

The alert level for each of the alert modes can also be increased if the processor 116 determines that the noise level in the vehicle is at or above a predetermined noise level (see decision block 228 of FIG. 2). For example, the processor 116 can signal the audio system 126 to increase the volume of the broadcast over the level originally intended for the particular alert mode. The processor 116 can also signal a greater number of illuminating indicators 130, or a more distractive type of illuminating indicator 130, to be activated over what would normally be triggered in accordance with the specific alert mode.

Figure 4:
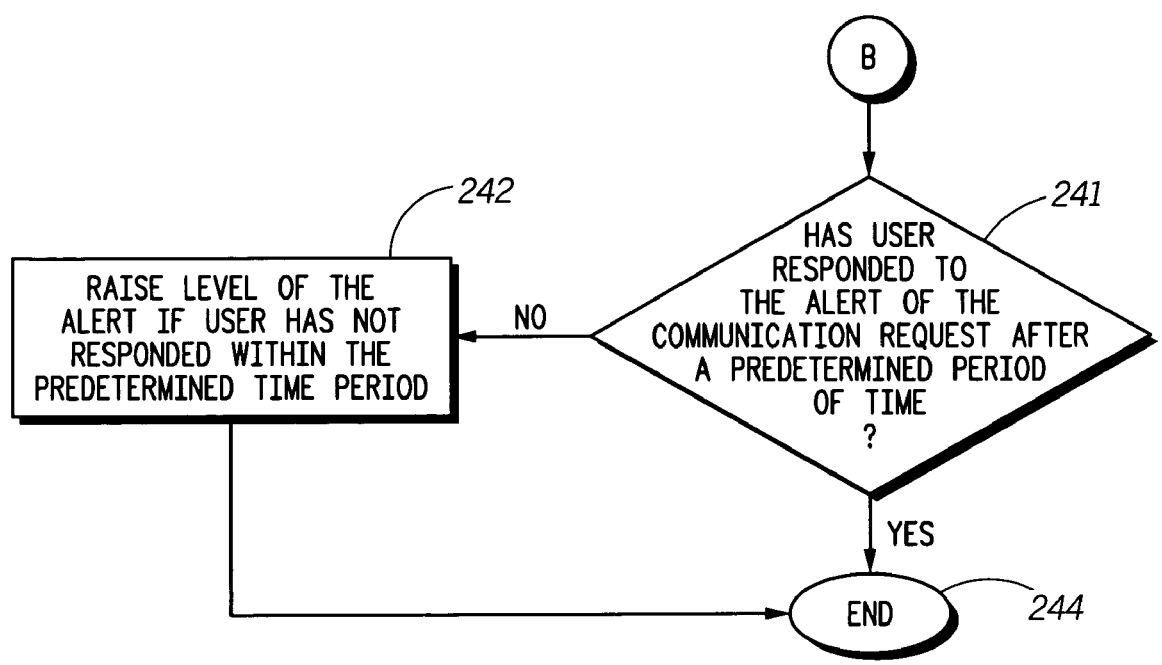
FIG. 4 illustrates yet another portion of the method of FIG. 2 in accordance with an embodiment of the inventive arrangements.

Referring to decision block 241 of FIG. 4, it can be determined whether the user has responded to the alert of the communication request after a predetermined period of time. If the user has, the method 200 can end at step 244. If the user has not, the method 200 can continue to step 242. At step 242, the level of the alert can be raised, and the method 200 can either resume at the decision block 241 or can end at step 244.

For example, referring back to FIG. 1, the processor 116 can monitor the attempts to alert the user of the communication request. If the user responds to the communication request, the processor 140 of the mobile communication device 110 can signal the vehicle interface 142, which in turn can signal the mobile unit interface 118. The mobile unit interface 118 can signal the processor 116, and the processor 116 can instruct the audio system 126 and/or the illuminating indicator 130 (or any other suitable component) to cease the alert. If, after a predetermined period of time, the user has not responded, the processor 116 can instruct the audio system 126 and/or the illuminating indicator 130 to raise the level of the alert. The phrase "raise the level of the alert" can include any act that may increase the chance that the user will respond to the communication request. For example, as described previously, the processor 116 can signal the audio system 126 to increase the volume of the broadcast used to alert the user of the communication request. As another example, the processor 116 can signal a greater number of illuminating indicators 130 to illuminate or can cause those illuminating indicators 130 that are more distracting or attention-grabbing to be activated.

This process can apply across all the different alert modes, including a situation where no predetermined vehicle condition is detected. The alert level can be repeatedly raised until the user responds to the communication request. Eventually, the processor 116 can instruct the audio system 126 and/or the illuminating indicator 130 to stop the alerting process after a predetermined period of time, as it may be likely that the user is not available for answering the communication request.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for alerting a user of a mobile communication device, comprising the steps of:
   receiving a communication request at the mobile communication device in a vehicle;
   detecting whether a predetermined vehicle condition is present in response to the receipt of the communication request;
   assigning a predetermined alert mode based on the presence of the predetermined vehicle condition; and
   alerting the user of the mobile communication device of the communication request in accordance with the assigned predetermined alert mode;
   wherein alerting the user of the mobile communication device comprises audibly alerting the user of the mobile communication device of the communication request through an audio system of the vehicle or visually alerting the user through an illuminating indicator of the vehicle.

2. The method according to claim 1, further comprising the step of coupling the mobile communication device to a control system of the vehicle, wherein the mobile communication device is coupled to the control system of the vehicle through a wireless connection or a hard-wired connection.

3. The method according to claim 1, further comprising the steps of:
   setting an alert option;
   when the communication request is received, checking the status of the alert option; and
   performing the alerting step only if the status of the alert option permits the alerting step.

4. The method according to claim 1, wherein when the user of the mobile communication device is audibly alerted of the communication request, the method further comprises the step of setting an audio alert level based on whether the alert mode is a high-risk alert mode, a moderate-risk alert mode or a low-risk alert mode.

5. The method according to claim 1, wherein when the user of the mobile communication device is visually alerted of the communication request, the method further comprises the step of setting an illumination alert level based on whether the alert mode is a high-risk alert mode, a moderate-risk alert mode or a low-risk alert mode.

6. The method according to claim 1, further comprising the steps of:
   detecting a noise level when the communication request is received; and
   reducing the noise level.

7. The method according to claim 1, further comprising the steps of:
   after a predetermined time period, determining whether the user has responded to the alert of the communication request; and
   raising the level of the alert if the user has not responded within the predetermined time period.

8. The method according to claim 1, wherein the predetermined vehicle condition is the vehicle being in a braking condition, the vehicle being on a wet road or the vehicle being in a predetermined speed range.

9. The method according to claim 8, wherein the predetermined alert mode is a high-risk alert mode, a moderate-risk alert mode or a low-risk alert mode.

10. The method according to claim 9, wherein the predetermined speed range is selected from a high speed range, a moderate speed range or a low speed range.

11. The method according to claim 10, wherein the assigning the alert mode step comprises assigning a high-risk alert mode if the predetermined vehicle condition is at least one of the vehicle being in a braking condition, the vehicle being on a wet road and the predetermined speed range being the high speed range.

12. The method according to claim 10, wherein the assigning the alert mode step comprises assigning a moderate-risk alert mode if the predetermined vehicle condition is the predetermined speed range being the moderate speed range.

13. The method according to claim 10, wherein the assigning the alert mode step comprises assigning a low-risk alert mode if the predetermined vehicle condition is the predetermined speed range being the low speed range.

14. A control system in a vehicle for alerting a user of a mobile communication device, comprising:
    a mobile unit interface, wherein the mobile unit interface receives a communication request from a mobile communication device in the vehicle;
    a processor coupled to the mobile unit interface, wherein the processor is programmed to:
       detect whether a predetermined vehicle condition is present in response to the receipt of the communication request; and
       assign a predetermined alert mode based on the presence of the predetermined vehicle condition; and
    an alert section coupled to the processor, wherein the alert section alerts the user of the mobile communication device of the communication request in accordance with the assigned predetermined alert mode.

15. The control system according to claim 14, wherein the mobile unit interface is coupled to a vehicle interface of the mobile communication device through a wireless connection or a hard-wired connection.

16. The control system according to claim 14, wherein the processor is further programmed to:
    when the communication request is received, check a status of an alert option;
    wherein the alert section alerts the user only if the processor determines that the status of the alert option permits the alert section to alert the user.

17. The control system according to claim 14, further comprising a sensor section, wherein the sensor section comprises:

a vehicle settings sensor for providing vehicle data to the processor;

a liquid sensor for signaling the processor when the liquid sensor detects the presence of a liquid on a roadway;

a night sensor for signaling the processor when the night sensor detects a night condition; or a noise sensor for providing a noise level to the processor.

18. The control system according to claim 14, wherein the processor is further programmed to:

after a predetermined time period, determine whether the user has responded to the alert of the communication request; and cause the level of the alert to be raised if the user has not responded within the predetermined time period.

19. The control system according to claim 14, wherein the alert section comprises a lighting system having an illuminating indicator or an audio system, wherein the alert section alerts the user through audibly alerting the user through the audio system or visually alerting the user through the illuminating indicator of the lighting system.

20. The control system according to claim 19, wherein when the audio system audibly alerts the user of the communication request, the processor is further programmed to set an audio alert level of the audio system based on whether the alert mode is a high-risk alert mode, a moderate-risk alert mode or a low-risk alert mode.

21. The control system according to claim 19, wherein when the illuminating indicator visually alerts the user of the communication request, the processor is further programmed to set an illumination alert level of the illuminating indicator based on whether the alert mode is a high-risk alert mode, a moderate-risk alert mode or a low-risk alert mode.

22. The control system according to claim 14, wherein the predetermined vehicle condition is the vehicle being in a braking condition, the vehicle being on a wet road or the vehicle being in a predetermined speed range.

23. The control system according to claim 22, wherein the predetermined alert mode is a high-risk alert mode, a moderate-risk alert mode or a low-risk alert mode.

24. The control system according to claim 23, wherein the predetermined speed range is selected from a high speed range, a moderate speed range or a low speed range.

25. The control system according to claim 24, wherein the processor is further programmed to assign a high-risk alert mode if the predetermined vehicle condition is the vehicle being in a braking condition, the vehicle being on a wet road or the predetermined speed range being the high speed range.

26. The control system according to claim 24, wherein the processor is further programmed to assign a moderate-risk alert mode if the predetermined vehicle condition is the predetermined speed range being the moderate speed range.

27. The control system according to claim 24, wherein the processor is further programmed to assign a low-risk alert mode if the predetermined vehicle condition is the predetermined speed range being the low speed range.

* * * * *